United States Patent
Dai et al.

(10) Patent No.: US 9,032,136 B2
(45) Date of Patent: May 12, 2015

(54) MEMORY CONTROLLER FOR MEMORY WITH MIXED CELL ARRAY AND METHOD OF CONTROLLING THE MEMORY

(75) Inventors: Bing Dai, Ossining, NY (US); Chung H. Lam, Peekskill, NY (US); Jing Li, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 13/610,830

(22) Filed: Sep. 11, 2012

(65) Prior Publication Data

US 2014/0052900 A1 Feb. 20, 2014

Related U.S. Application Data (63) Continuation of application No. 13/587,967, filed on Aug. 17, 2012.

(51) Int. Cl.
*G06F 12/02* (2006.01)

(52) U.S. Cl.
CPC ...................... *G06F 12/02* (2013.01)

(58) Field of Classification Search
CPC ........................................ G06F 12/02
USPC ........... 711/103, 170, 105, E12.008, E12.002
See application file for complete search history.

(56) References Cited

U.S. PATENT DOCUMENTS

| | | | |
|---|---|---|---|
| 6,899,938 B2 | 5/2005 | Flynn | |
| 7,254,059 B2 | 8/2007 | Li et al. | |
| 7,375,365 B2 | 5/2008 | Hsiung | |
| 7,488,968 B2 | 2/2009 | Lee | |
| 7,696,503 B2 | 4/2010 | Lung et al. | |
| 8,244,960 B2 * | 8/2012 | Paley et al. | 711/103 |
| 2003/0165111 A1 | 9/2003 | Flynn | |
| 2006/0077706 A1 | 4/2006 | Li et al. | |
| 2006/0077741 A1 | 4/2006 | Wang et al. | |
| 2006/0097239 A1 | 5/2006 | Hsiung | |
| 2006/0249725 A1 | 11/2006 | Lee | |
| 2006/0257787 A1 | 11/2006 | Kuo et al. | |
| 2007/0249083 A1 | 10/2007 | Li et al. | |
| 2007/0274121 A1 | 11/2007 | Lung et al. | |
| 2008/0185575 A1 | 8/2008 | Hsiung | |
| 2009/0040814 A1 | 2/2009 | Kang et al. | |
| 2009/0073754 A1 | 3/2009 | Bae et al. | |
| 2009/0080242 A1 | 3/2009 | Resta et al. | |
| 2009/0111249 A1 | 4/2009 | Lee | |
| 2009/0244963 A1 | 10/2009 | Karpov et al. | |

(Continued)

OTHER PUBLICATIONS

SLC vs. MLC: An Analysis of Flash Memory, Super Talent, 2008.

(Continued)

*Primary Examiner* — Pierre-Michel Bataille
(74) *Attorney, Agent, or Firm* — Law Offices of Charles W. Peterson, Jr.; Louis J. Percello, Esq.

(57) ABSTRACT

A memory controller, system including the memory controller and method of controlling the memory. The memory controller receives requests for memory and content sensitively allocates memory space in a mixed cell memory. The memory controller allocates sufficient space including performance memory storing a single bit per cell and dense memory storing more than one bit per cell. Some or all of the memory may be selectable by the memory controller as either Single Level per Cell (SLC) or Multiple Level per Cell (MLC).

21 Claims, 6 Drawing Sheets

(56) References Cited

U.S. PATENT DOCUMENTS

| | | |
|---|---|---|
| 2010/0110779 A1 | 5/2010 | Liu et al. |
| 2010/0151652 A1 | 6/2010 | Lung et al. |
| 2010/0165712 A1 | 7/2010 | Bedeschi et al. |
| 2012/0169480 A1* | 7/2012 | Jantunen et al. ........... 340/10.51 |
| 2013/0346676 A1* | 12/2013 | Kim .............................. 711/103 |

OTHER PUBLICATIONS

R. F. Freitas et al., Storage-class memory: The next storage system technology, IBM J. Res. & Dev. vol. 52 No. 4/5 Jul./Sep. 2008.

* cited by examiner

Fig. 7 though possibly slower, memory for performance insensitive content.

MEMORY CONTROLLER FOR MEMORY WITH MIXED CELL ARRAY AND METHOD OF CONTROLLING THE MEMORY

CROSS REFERENCE TO RELATED APPLICATIONS

The present application is continuation of U.S. patent application Ser. No. 13/587,967, "MEMORY CONTROLLER FOR MEMORY WITH MIXED CELL ARRAY AND METHOD OF CONTROLLING THE MEMORY" filed Aug. 17, 2012; and related to U.S. patent application Ser. No. 13/587,976, "MEMORY WITH MIXED CELL ARRAY AND SYSTEM INCLUDING THE MEMORY," filed Aug. 17, 2012; and to U.S. patent application Ser. No. 13/610,834, "MEMORY WITH MIXED CELL ARRAY AND SYSTEM INCLUDING THE MEMORY," filed herewith, all to Bing Dai et al., assigned to the assignee of the present invention and incorporated herein by reference.

BACKGROUND OF THE INVENTION

1. Field of the Invention

The present invention is related to shared memory, and more particularly, to memory shared by multiple processors and efficient allocation and use of the memory by the processors.

2. Background Description

Semiconductor technology and chip manufacturing advances have resulted in a steady increase of Central Processing Unit (CPU), or processor, processing power and memory performance, allowing packing more function in the same or smaller chip area, i.e., density. Generally, these densely packed chips are much more powerful and consume much more power for each given unit of chip area. Although a number of factors determine computer system performance, performance is primarily the result of the particular CPU and memory performance.

In theory X processors improve performance by a factor of X. So, a typical high performance computer system increases performance by increasing the number of processors, e.g., in a multiprocessor system, sharing correspondingly larger high-performance main memory as well. Both Intel® and Advanced Micro Devices (AMD), Inc., for example, offer off-the-shelf, multi-processors (multiple core processors) for PCs and the like, currently with as many as 8 cores. A state of the art high performance PC with such an 8-core multi-processor, for example, might be equipped with 32 gigabyte (32 GB) or more of main memory; some form of non-volatile storage, e.g., a Hard Disk Drive (HDD) or a Solid State Disk Drive (SSDD); a display capability (e.g., integrated on board); and, any additional feature cards. These multi-core processors have found use even in what was once considered low end, state of the art mobile applications, such as the iPhone® or iPad® from Apple, Inc.

While state of the art multi-core PCs may dedicate cache memory for each core, on or off chip or module, the cores share a much larger main memory. During normal operation each core may be running one or more applications in one or more threads and/or providing one or more virtual machines. As each application/processor thread opens the respective processor requests memory from the main memory, and usually receives a memory space allocation sufficient to satisfy the request. Although processor speed is the main performance determinant, a fast processor can only take full advantage of its speed with equally fast memory. For example, one rule of thumb is that replacing relatively slow memory in a Personal Computer (PC) with higher performance memory, e.g., 30-50% faster, improves average performance by 10-20%.

A typical memory controller for such main memory (PC or mobile device) is selected/designed to treat all memory in main memory identically. So, if memory on one Dual Inline Memory Module (DIMM) is slower than the others, the controller operates all of the DIMMs at that the slower speed. For example, for 4 DIMMs with 3 capable of 800 ns bus speeds and 1 only capable of 500 ns bus speeds, the controller would run all 4 at 500 ns. These state of the art systems also have allocated memory to all processors/cores for all applications/threads regardless of individual application/thread performance requirements. As a system user opened more and more, the concurrent activity and memory allocation could rise to a point that tended to stress shared memory capabilities.

Adding memory and function in older technologies also had increased power requirements, much of which has increased integration has alleviated. In older PCs, for example, adding many functions required adding system boards, e.g., sound, a Network Interface card or Circuit (NIC), modem and a display adapter. These functions have been integrated into single on-board (on motherboard) chips or parts of chips, to reduce overall system power. Also, disk drives have required significant power, much of which can be eliminated by using SSDDs. SSDDs use well known Non-Volatile Random Access Memory (NVRAM) or flash memory as hard disk space. SSDDs have improved non-volatile storage (disk) performance to near Dynamic RAM (DRAM) performance. In mobile devices where both size and power are constrained, among other things by mobile device package size, battery life, and minimal cooling capacity, much lower power NVRAM has replaced high performance, high power DRAM.

While technology has reduced power required for individual function, adding more and more function has increased system power requirements. So for example, an eight core processor consumes on the order of one hundred twenty five watts (125 W) and system RAM consumes another 30 W. While memory chip capacity normally quadruples with each generation, at times system memory requirements have outpaced chip capacity increases. Without a change in technology generation, increasing main memory capacity has involved adding more memory chips/DIMMs to the system.

As noted hereinabove, adding components (DIMMs) increases space requirements and power consumption. The more power that system components consume, the higher the power supply capacity required and the more the system requires costly cooling components. Kingston® Technology, for example, offers water-cooled high-performance DIMMs. This all adds to system cost.

Thus, there is a need for reducing system main memory real estate and power consumption and more particularly increasing system main memory capacity and density while reducing system memory real estate and power consumption.

SUMMARY OF THE INVENTION

A feature of the invention is main memory managed for lower power;

Another feature of the invention is main memory managed for density in a multi-processor system;

Yet another feature of the invention is content sensitively allocating memory for each request for memory, sufficient higher performance memory being allocated for performance sensitive content, the balance being denser memory;

The present invention relates to a memory controller, system including the memory controller and method of controlling the memory. The memory controller receives requests for memory and content sensitively allocates memory space in a mixed cell memory. The memory controller allocates sufficient space including performance memory storing a single bit per cell and dense memory storing more than one bit per cell. Some or all of the memory may be selectable by the memory controller as either Single Level per Cell (SLC) or Multiple Level per Cell (MLC). Thus, the memory controller may allocate identical memory space to two processors, while half, or fewer, than the number of cells of one are assigned to the other.

One embodiment is a method of managing memory comprising: receiving a request to allocate mixed cell memory comprising performance memory and dense memory; identifying performance requirements for content associated with said request; and allocating said mixed cell memory content sensitively responsive to the request.

In this embodiment, allocating said memory content sensitively may comprise: allocating performance memory space for performance sensitive content; and allocating remaining requested space in said dense memory. Mixed cell memory may comprise storage class memory (SCM). The may method further comprise providing read and write signals for accessing said SCM. Performance memory may comprise dynamic random access memory (DRAM), both DRAM and SCM being allocated for at least one request, said method further comprising maintaining a memory map of allocated DRAM and SCM. SCM may comprise a plurality of Single Level per Cell (SLC) units and a plurality of Multiple Level per Cell (MLC) units, allocating said performance memory comprising allocating ones of said plurality of SLC units. SCM may be selectable as SLC or MLC, with the method further comprising selecting SCM units as SLC or MLC. The method may further comprise: SLC units and said MLC units indicating cell capacity during each access; and selectively providing SLC and MLC read and write signals for accessing allocated SLC units and said MLC units.

Another embodiment is a method of managing memory comprising: receiving requests for mixed cell memory space from a plurality of processing units, each processing unit being capable of running one or more applications with one or more thread for each application, said each processing unit selectively requesting memory space; allocating mixed cell memory content sensitively responsive to each request for memory space and further responsive applications and threads associated with a respective requesting processing unit, said mixed cell memory comprising performance memory and dense memory storing more bits in each cell than performance memory; and managing memory accesses responsive to allocation.

In this embodiment, allocating mixed cell memory content sensitively may comprise: allocating sufficient performance memory for performance sensitive said applications and threads, and otherwise allocating sufficient dense memory to satisfy remaining requested space. A method as in claim 10, wherein said mixed cell memory comprises storage class memory (SCM), and managing memory accesses comprises providing read and write signals for reading and writing said mixed cell memory.

Another embodiment is a method of managing memory comprising: receiving memory space requests in a mixed cell memory from a plurality of processing units, each processing unit being capable of running one or more applications with one or more thread for each application, said mixed cell memory including a plurality of performance memory units storing one bit in each cell and a plurality of dense memory storing multiple bits in each cell; identifying content sensitivity associated for associated applications and threads in each of said requests, content sensitivity including performance requirements; allocating space in said mixed cell memory content sensitively responsive to each memory space request, sufficient performance memory being allocated for identified said applications and threads sensitive to latency, and otherwise allocating sufficient dense memory space; and managing memory accesses responsive to allocation.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
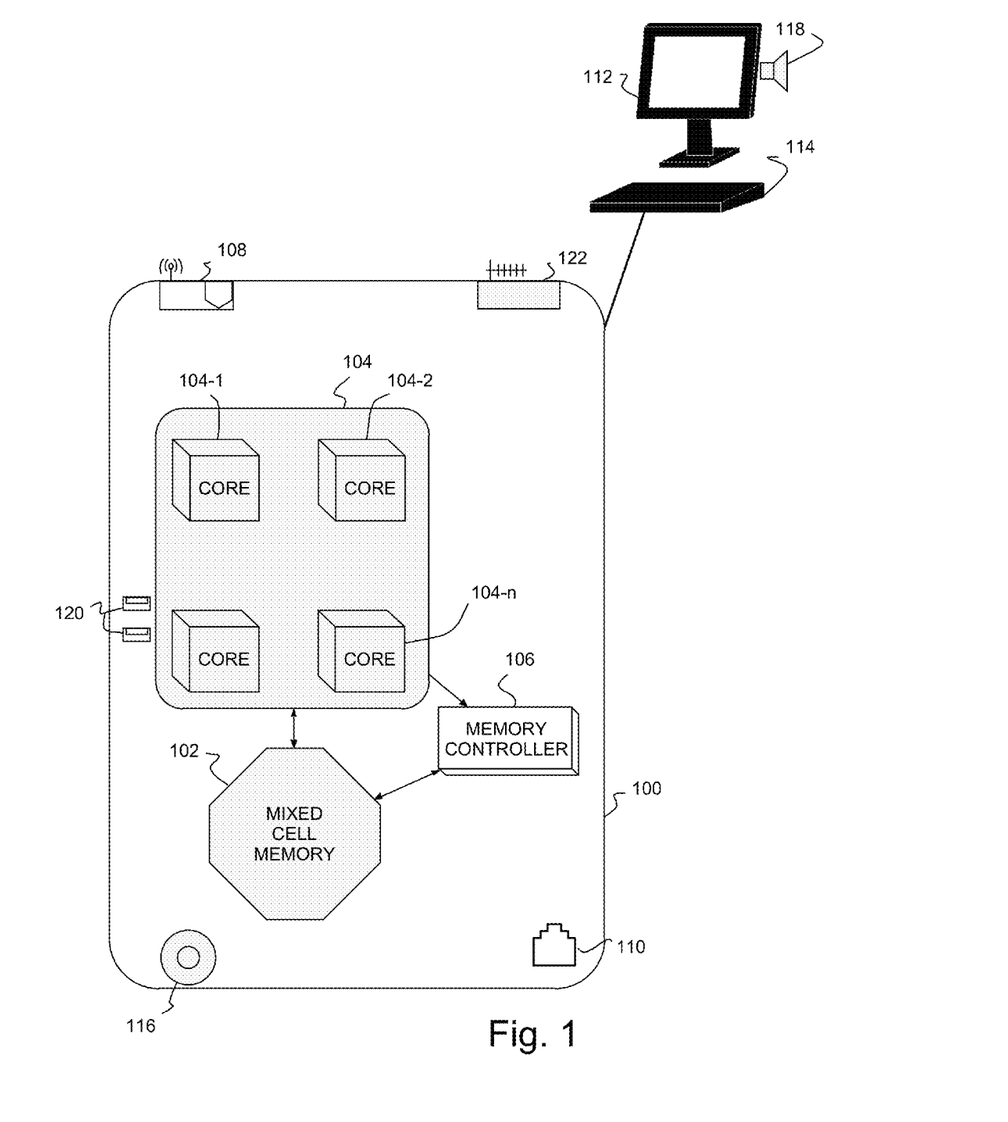
FIG. 1 shows an example of a system with main, mixed cell memory that is architected according to a preferred embodiment of the present invention.

Turning now to the drawings and more particularly, FIG. 1 shows an example of a system 100 with main memory that is mixed cell Random Access Memory (RAM) 102 architected according to a preferred embodiment of the present invention. The system 100 may be any suitable information handling system or device, such as, for example, a main frame computer, a Personal Computer (PC), a laptop computer, or a hand held device, such as, a tablet computer, a Personal Digital Assistant (PDA) or a smart phone. In this example, the system 100 includes in a single multi-core processor 104 with multiple processors or cores 104-1, 104-2, . . . , 104-*n* sharing mixed cell RAM 102 controlled by a preferred memory controller 106. The memory controller 106 content sensitively allocates memory to each processor 104-1, 104-2, . . . , 104-*n*, based on application/thread performance requirements and sensitivity according to a preferred embodiment of the present invention.

The preferred memory controller 106 allocates mixed cell RAM 102 content sensitively, based on performance sensitivity of the content to be stored in particular memory locations. Once allocated, the memory controller 106 manages memory access according to application/thread needs. The preferred mixed cell RAM 102 includes memory with a performance range and density variety that may be selected based on performance over density; and/or cost (higher density) over performance, such as described in to U.S. patent application Ser. No. 13/587,976, "MEMORY WITH MIXED CELL ARRAY AND SYSTEM INCLUDING THE MEMORY" to Bing Dai et al., filed coincident herewith, assigned to the assignee of the present invention and incorporated herein by reference.

As each core 104-1, 104-2, . . . , 104-n requests memory, the memory controller 106 allocates higher performance memory to performance-critical threads or applications, and otherwise, allocates denser, lower performance (and lower cost) memory, e.g., for data intensive applications or threads. Thus for example, two processors or cores, e.g., 104-1 and 104-2 may be assigned identical memory space, while half the number of cells or fewer assigned to one are assigned to the other. After allocation the memory controller 106 manages memory accesses, providing proper timing for the memory type allocated.

A preferred system 100 also may include a number of optional functions or capabilities. So, in this example, the system 100 includes a wireless or wired Network Interface Circuit (NIC) capability 108 and/or a telephone interface 110, e.g., a NIC chip or function on part of a chip or module, and a land line modem or a cellular (3G or 4G) modem. A user interface includes a display 112 and a manual input capability 114, e.g., individually or combined in a touch screen. A multimedia capability may include an audio input capability 116, e.g., a microphone, and an audio output capability 118, e.g., speakers. The system 100 may also include one or more peripheral ports, e.g., Universal Serial Bus (USB) or High-Definition Multimedia Interface (HDMI) ports 120 and built-in or added Bluetooth 122.

Figure 2:
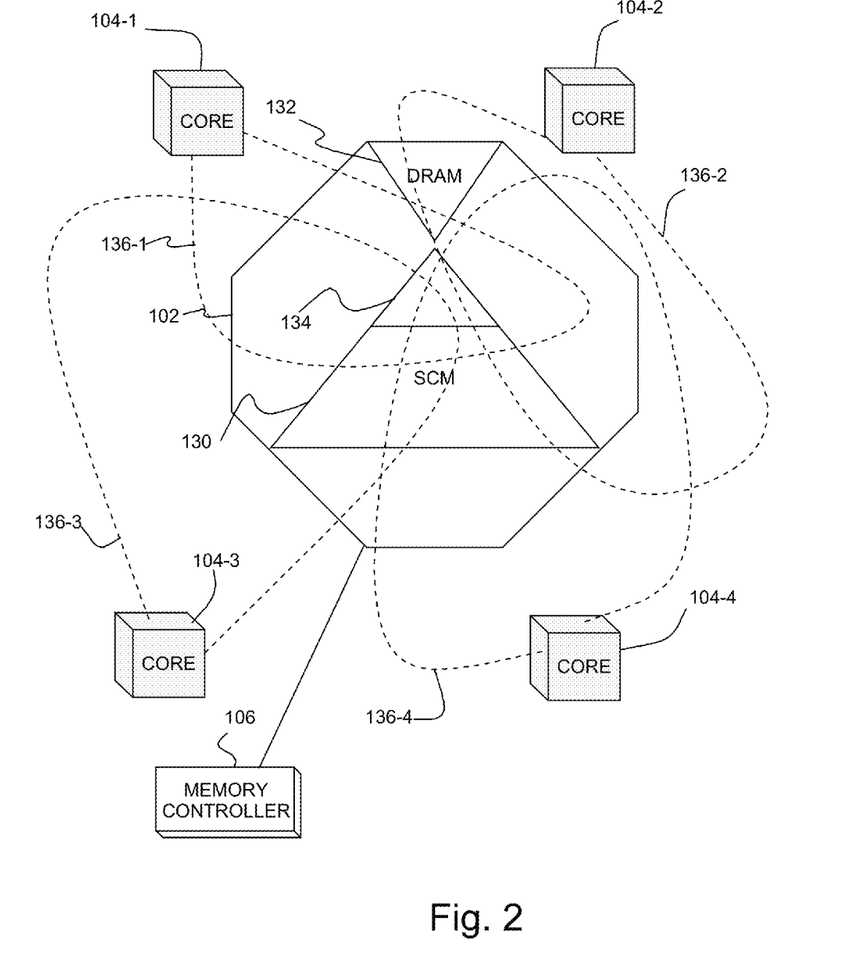
FIG. 2 shows an example of organization of preferred mixed cell memory with a variety of memory, that vary with a range of performance and density.

As shown in the example of FIG. 2, preferred mixed cell RAM 102 includes a variety of RAM, varying with a range of performance and density. Thus, the preferred mixed cell RAM 102 includes bulk memory 130, which may be lower performance, dense (low cost) storage, e.g., Storage-Class Memory (SCM). SCM is used normally, for example, in thumb drives or Solid State Disk Drives (SSDDs), including flash memory or Non-Volatile RAM (NVRAM). Also, preferred mixed cell RAM 102 includes performance memory, which is high performance, less dense memory that also may be SCM 134. Optionally, performance memory includes traditional, high-performance RAM, such as Dynamic RAM (DRAM) 132 or Static RAM (SRAM, not shown).

The memory controller 106, interfaces the cores (in this example 4 cores 104-1, 104-2, 104-3 and 104-4) with the mixed cell RAM 102. The memory controller 106 assigned 136-1, 136-2, 136-3, 136-4 memory to each core 104-1, 104-2, 104-3, 104-4, based on the application(s)/thread(s) currently active in each core and the requirements of each application/thread. Further, SRAM, DRAM and SCM all have different access and write times. So, the memory 130, 132, 134 in the mixed cell RAM 102 has location dependent performance and access timing requirements. The memory controller 106 interfaces the core 104-1, 104-2, 104-3, 104-4 with assigned 136-1, 136-2, 136-3, 136-4 memory 130, 132, 134, insuring control matches location performance and access timing, e.g., read and write set up, hold and any handshake protocol.

Preferably, the memory controller 106 is specifically designed to handle the needs of the RAM in the preferred memory. However, a suitable preferred memory controller 106 may just be a combination of performance and density memory controllers with sufficient glue logic, each controller handling needs of the respective memory in RAM 102.

Figure 3:
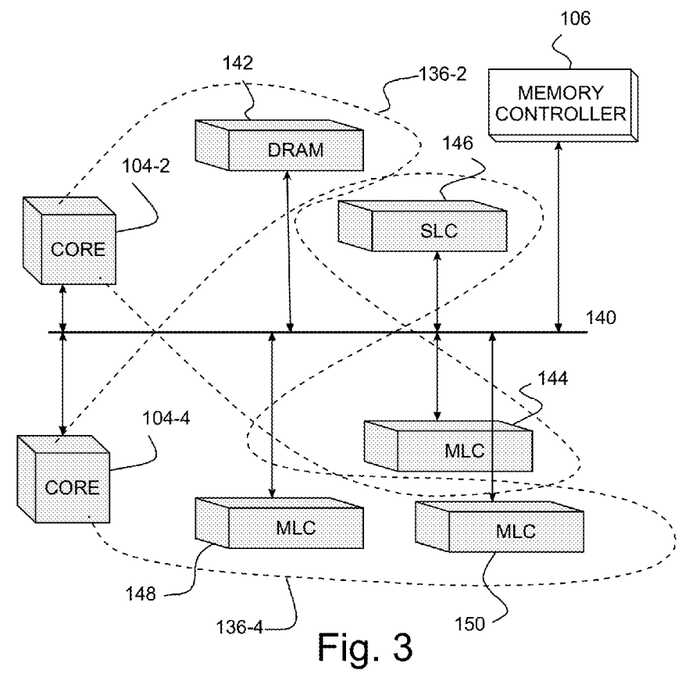
FIG. 3 shows an example of assignment of shared mixed cell memory to cores.

FIG. 3 shows an example of preferred mixed cell RAM 102 assigned 136-2, 136-4 to cores 104-2, 104-4 with reference to FIGS. 1 and 2 with like elements labeled identically. In this example the cores 104-2, 104-4 communicate with DRAM 142 (in 132) and SCM 144, 146, 148, 150 (in 130, 134) and memory controller 106 over memory bus 140. In this example, the memory controller 106 has previously assigned 136-2 DRAM 142, and SCM 144 to core 104-2, and assigned 136-4 memory 146, 148, 150 to core 104-4. The preferred SCM may include Single-Level Cell (SLC) flash memory 146 and denser Multi-Level Cell (MLC) flash memory 144, 148, 150. In one embodiment, the SLC unit(s) 146 and MLC units 144, 148, 150 have fixed, unchangeable architecture, i.e., SLC memory is designed as SLC memory and MLC memory is designed as MLC memory, and segments are selected and assigned based on expected needs.

Figure 4:
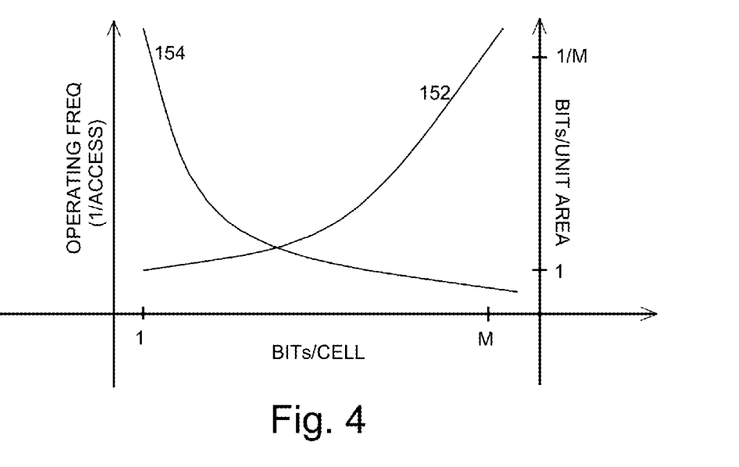
FIG. 4 shows the tradeoff of density and performance for SCM cells.

FIG. 4 shows a comparison of the tradeoff of density 152 (e.g., in bits, megabits, gigabits, etc., per unit area) and performance 154 (operating frequency, e.g., the number of successive accesses (one read and one write) per second) for SCM cells. From this it is apparent that one trades performance for density. The variable density memory in SCM 130, 134 includes reconfigurable support circuits, e.g., sense amplifiers and write heads or circuits that are configurable for the particular selected storage configuration. When selected as SLC memory 142, 146, the SCM cells program coarsely with two states, programmed and unprogrammed or erased. Detecting one state, e.g., the programmed state, may be designated as detecting a logic one ("1"); and, detecting the other state, the erased or unprogrammed state, is designated detecting as a logic zero ("0"). Reading the contents of, as well as storing data in, the MLC memory 144, 148, 150 is somewhat more complex and typically takes somewhat more time.

Figure 5:
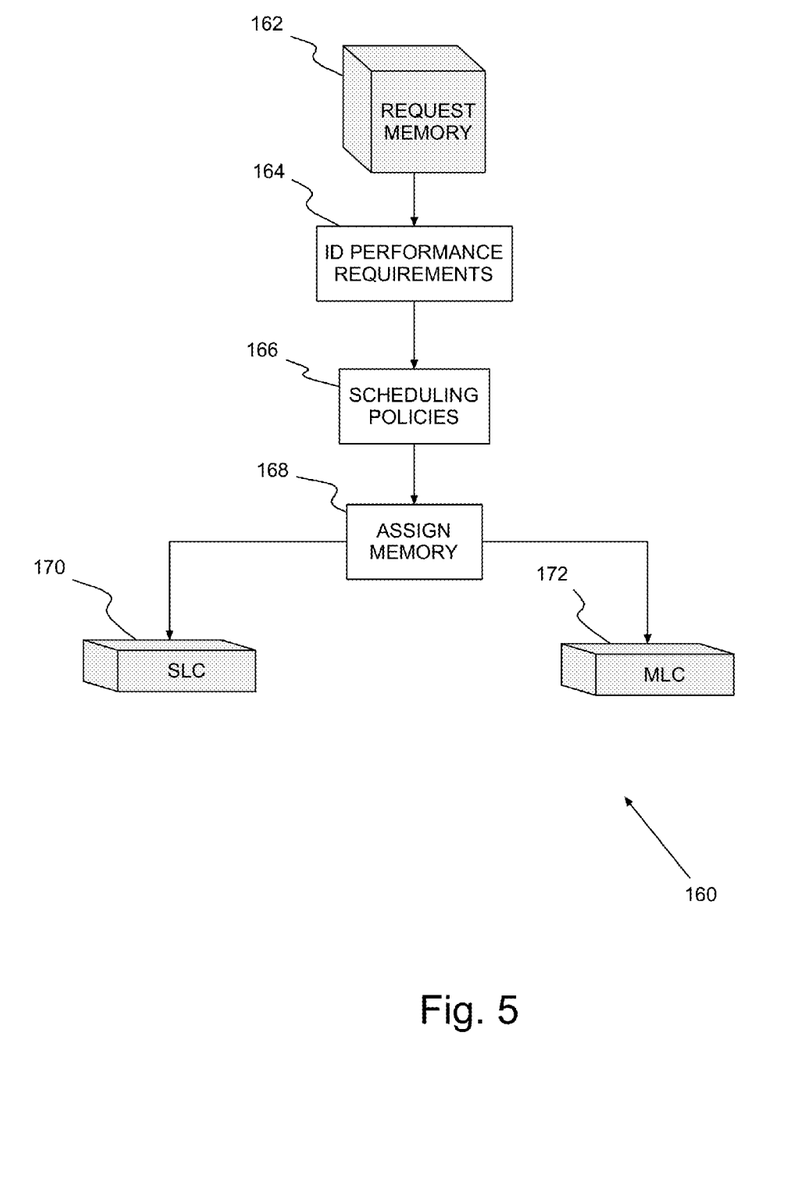
FIG. 5 shows an example of memory assignment for a preferred memory controller content sensitively allocating high performance memory and denser memory for a requesting core or processor, based on core/processor requirements for particular applications, threads and data

FIG. 5 shows an example of memory assignment 160 for a preferred memory controller (106 in FIGS. 1, 2 and 3) content sensitively allocating high performance memory 142, 146 and denser memory 144, 148, 150 for a requesting 162 core or processor. As noted hereinabove, allocation is based on core/processor requirements for particular applications, threads and data being stored in the respective allocated memory, according to a preferred embodiment of the present invention. As the memory controller 106 receives a request 162, it identifies 164 threads within the request for bandwidth or latency requirements. Then, the memory controller 106 applies memory policies 166 in response to the identified requirements without reordering and, finally, assigns memory 168 based on the identified requirements. Latency sensitive segments are assigned and stored 170 in higher performance memory, DRAM 132 and SLC 134. Otherwise, bandwidth sensitive segments are distributed 172 in denser, MLC 130. The cores 104-2, 104-4 operate normally, seamlessly and transparently accessing assigned memory 136-2, 136-4; while using significantly fewer memory cells than the memory space assigned, consuming less power and without noticeable performance degradation.

The preferred memory controller 106 identifies 164 storage type, for example, by way of flags in the applications, specific instructions to be executed, and file extensions. Applications may include flags, for example, at the beginning of an application or at locations within the application to bracket or demarcate denser and performance segments. These flags may be added, for example, by a compiler when source code is compiled.

The memory controller 106 applies memory policies 166, e.g., First Come First Serve (FCFS) or First Ready-FCFS (FR-FCFS), in response to identified requirements without reordering. As noted hereinabove, mixed cell RAM 102 may include assignable memory with fixed capacity, e.g., a combination of DRAM 132 and MLC 130; DRAM 132, SLC 134 and MLC 130 or just SCM (SLC 134 and MLC 130). For a fixed capacity mixed cell RAM 102, the memory controller 106 may simply maintain a memory map and assign core memory from the map in response to thread requirements and potential tolerances, i.e., activities capable of tolerating the lower performance associated with more dense MLC.

So, for example, file extensions identify applications and application extensions, e.g., .exe or .dll. Likewise, data files use file extensions that indicate the content type of the data in the particular file. There are a number of file extensions, for example, identifying compressed audio or video, photographs and other images, word processing or desktop publishing documents.

Typical high order calculation or combinational logic operators in an application, for example, may be performance sensitive, such that memory access delays (e.g., from retrieving data to be operated on) degrade processor performance and thus, system performance. By contrast compressed data, such as audio or video, may be pre-fetched and tolerate relatively long decompression time gaps between accesses. Thus, much or most applications (.exe) may be loaded, primarily, into performance memory. Similarly, many of the application extensions (All) may be loaded primarily into performance memory with the balance loaded into bulk MLC memory. In particular, much of, or most, remaining data files may also be loaded into the bulk memory.

Arrays of different types of memory (e.g., DRAM, SRAM, SCM) in the preferred mixed cell RAM 102 may be integrated with support as units on one or more common chips or segregated on dedicated chips. Preferably, the preferred mixed cell RAM 102 is as compact as possible without sacrificing system level performance for density. Preferably also, to accommodate the particular processor 104 architecture, depending on the processor 104 interface, the mixed cell memory 100 is organized multiple bits wide and more preferably, multiple bytes wide to accommodate the memory bus 140. So for example, memory bus 140 is 32 or 64 bits wide, with units in one or more addressable banks. The mixed cell RAM 102 array (i.e., the cell array) may have all cells on a single chip or multiple chips, with SRAM/DRAM and storage class memory segregated or intermingled. SCM may be, for example, Phase Change Memory (PCM), Resistive RAM (RRAM) or any suitable non-volatile storage. Preferably, the SCM 130, 134 is variable density memory with cells being selectable/reconfigurable as single bit (142, 145) or multiple bit (144, 148, 150) per cell, as selected by the memory controller 106.

Figure 6:
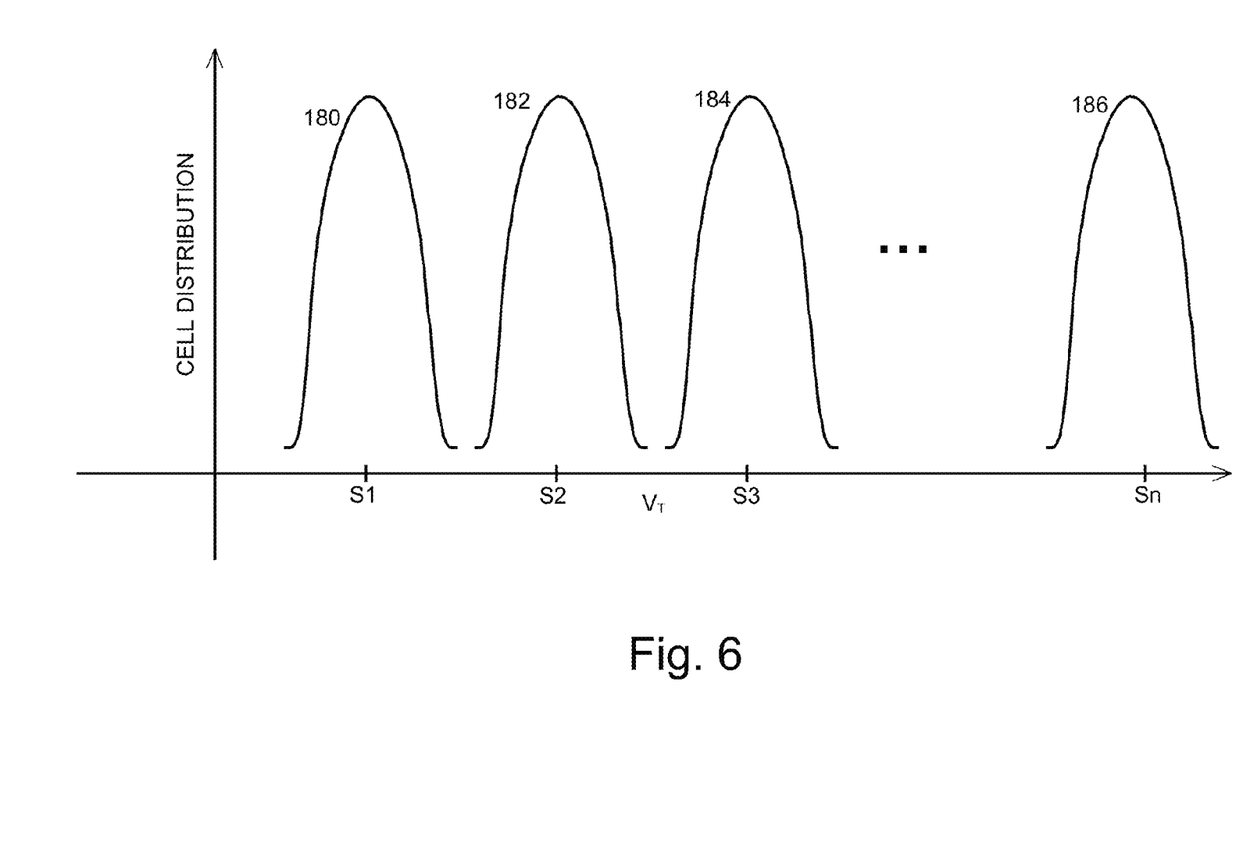
FIG. 6 shows an example of ranges identifying a number of preferred multi-level cell programmable states.

FIG. 6 shows an example of programmed threshold ranges 180, 182, 184, 186, that may be used to identify a number (n, where $n=2^m$) of preferred multi-level cell programmable states S1, S2, S3, . . . , Sn, e.g., the programmed threshold distribution for cells across a chip. Each MLC stores m bits and may include, for example, a single storage device with a programmable variable threshold voltage ($V_T$) that may be programmed to one of the ranges 180, 182, 184, 186. Typically, both reading and writing one of the n states can take several times, e.g., n times, longer than for an SLC.

Similarly, variable resistors in programmable resistance cells, for example, are varied to one of n resistances, or variable capacitor in programmable capacitance cells are varied to one of n capacitances. Sensing what is stored in each type of cell may be determined by how long a load on each takes to reach a particular voltage, e.g., for a variable resistor to charge/discharge a fixed capacitance or for a fixed resistance to charge/discharge a variable capacitor. Thus, how m bits are stored in each cell depends on the particular storage media. So, when a preferred N mega cell array is selected as SLC, it stores N Megabits (Mb); and when it is selected as MLC, it stores m*N MB.

For a multimedia application for viewing a movie, for example, the application (e.g., a codex) may require one or two megabytes (1-2 MB) of memory and the application extensions half again as much. DVD quality video, on the other hand, may require three or four gigabyte (3-4 GB), three orders of magnitude larger. Loading that video into two bit MLC requires half as many cells, and correspondingly, about half the power or more and space of SLC memory, or the same space as, and power or less than, two gigabytes of SLC. Power may be much less, for example, if SLC is SRAM or DRAM. Four bit MLC requires one quarter as many cells and, therefore, the power or less and space of 1 GB of SLC memory. All of the savings is with little or no loss in performance.

Figure 7:
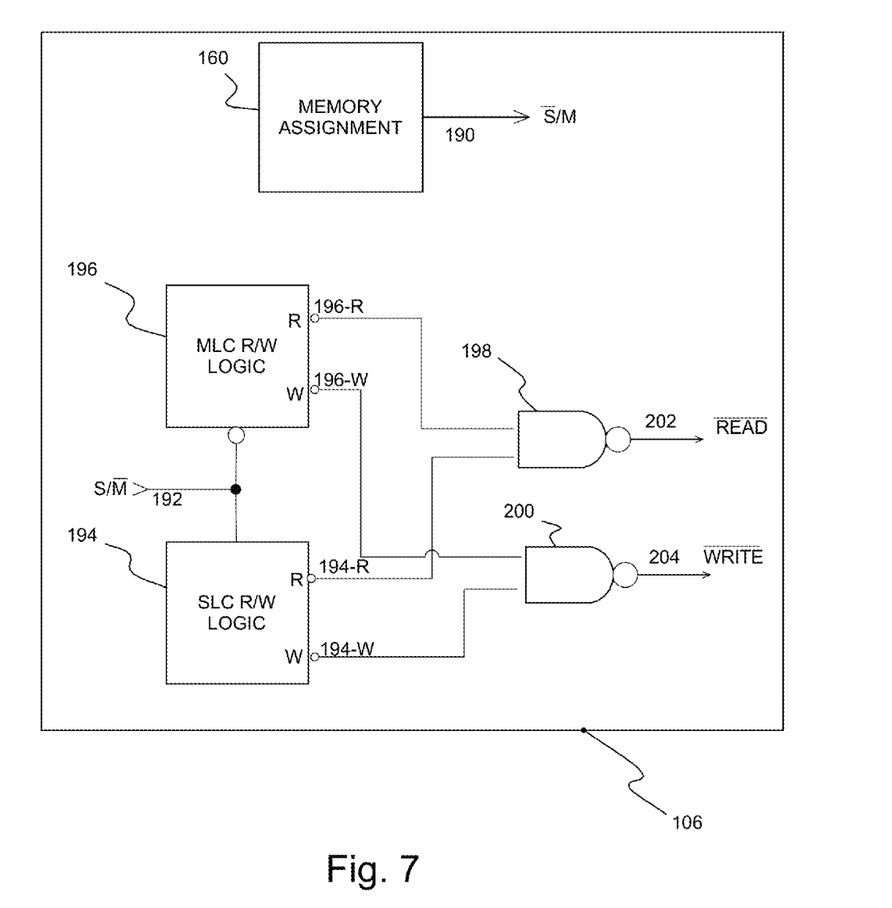
FIG. 7 shows a simple example of a preferred the memory controller, wherein SCM units are configurable/selectable as SLC or MLC.

FIG. 7 shows a simple example of an embodiment where a preferred the memory controller 106 with reference to FIGS. 3 and 5, wherein SCM units 144, 146, 148, 150 are configurable/selectable 168 as SLC 170 or MLC 172. Thus, memory assignment logic 160 includes a single capacity assignment output 190, not Single, Multi ($\neg$ S/M), which is passed over the memory bus with addresses and an assignment signal (not shown) for each block being designated. Subsequently, as a core accesses assigned memory, the memory responds with a signal 192 that indicates cell capacity, Single, not Multi (S/$\neg$ M), in this example. Also in this example, the memory controller 106 includes SLC memory timing logic 194 and MLC memory timing logic 196. NAND gates 198, 200, combine read signals 194-R, 196-R or write signals 194-W, 196-W, to generate memory Read 202 and memory write 204 signals that pass over memory buss 140 to the mixed cell memory, 102 in FIG. 1.

A core accessing assigned memory for a read or a write, notifies the memory controller 106, indicating a read or write (not shown). The mixed cell RAM 102 respond with a high or low on S/$\neg$ M signal 192, which selects SLC timing 194 or MLC timing 196. Once selected, the respective SLC timing 194 or MLC timing 196 asserts (i.e., drives low) properly timed read signals 194-R, 196-R or write signals 194-W, 196-W. SLC timing depends on the particular memory being accessed and providing proper read or write timing for DRAM. As a result of the signals generated by SLC timing 194 or MLC timing 196, memory Read 202 or memory write 204 is driven high for a read or write signal timed for the type of memory being accessed.

Optionally, the preferred memory controller 106 may further program cells for 2n, 4n, 8n, . . . states. The reconfigurable sense amplifiers sense single bit contents when the cells are selected as SLC; and, sense the n states and encode the results to indicate all m bits when the same cells are selected as MLC. Similarly, the cell write heads are selectable as single bit, two state (programmed and unprogrammed) writing for SLC; and for decoding m bits into one of the n states and writing that state for MLC.

Thus, advantageously, instead of allocating identical physical memory to every processor in a multiprocessor system, regardless of requirements of active applications or threads in the processors; according to the present invention, higher performance memory is allocated sensitive to content, where needed, and cheaper, denser memory is allocated everywhere else. Because the preferred mixed cell memory includes memory with a range and variety selectable for performance, fewer memory cells serve (i.e., a smaller array serves) a larger memory space that would otherwise merit a much larger conventional memory. Processors may be assigned identical memory space, for example, with half the number of cells or fewer of assigned one processor than are assigned to other processors.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A method of managing memory comprising:
   receiving a request to allocate mixed cell memory from one of a plurality of processing units sharing said mixed cell memory, said mixed cell memory comprising performance memory and dense memory;
   identifying performance requirements for content associated with said request; and
   allocating said performance memory and dense memory, content sensitively responsive to identified said performance requirements associated with the request, wherein allocating said memory content sensitively allocates all performance memory, all dense memory or a combination of performance memory and dense memory for said request and comprises:
      allocating performance memory space for identified performance sensitive content, and
      allocating remaining requested space in said dense memory.

2. A method as in claim 1, wherein said mixed cell memory comprises storage class memory (SCM) units, each of said SCM units including a plurality of SCM cells.

3. A method as in claim 2, said method further comprising providing read and write signals for accessing said SCM.

4. A method as in claim 3, wherein said performance memory comprises dynamic random access memory (DRAM) units, each of said DRAM units including a plurality of DRAM cells, both DRAM units and SCM units being allocated for at least one request, said method further comprising maintaining a memory map of allocated DRAM and SCM units.

5. A method as in claim 3, wherein said SCM comprises a plurality of Single Level per Cell (SLC) units and a plurality of Multiple Level per Cell (MLC) units, and wherein allocating said performance memory comprises allocating ones of said plurality of SLC units as said performance memory.

6. A method as in claim 3, wherein said SCM units are selectable as SLC or MLC, said method further comprising selecting SCM units as SLC or MLC.

7. A method as in claim 6, said method further comprising:
   said SLC units and said MLC units indicating cell capacity during each access; and
   selectively providing SLC and MLC read and write signals for accessing allocated SLC units and said MLC units.

8. A method of managing memory comprising:
   receiving requests for mixed cell memory space from a plurality of processing units, each processing unit being capable of running one or more applications with one or more thread for each application, said each processing unit selectively requesting memory space;
   allocating mixed cell memory content sensitively responsive to each request for memory space and further responsive to applications and threads associated with a respective requesting processing unit, said mixed cell memory comprising performance memory and dense memory storing more bits in each cell than performance memory; and
   managing memory accesses responsive to allocation, wherein allocating mixed cell memory content sensitively allocates all performance memory, all dense memory or a combination of performance memory and dense memory to each request, and comprises:
      allocating sufficient performance memory space for performance sensitive said applications and threads, and otherwise
      allocating sufficient dense memory space to satisfy remaining requested space.

9. A method as in claim 8, wherein said mixed cell memory comprises storage class memory (SCM) units, each of said SCM units including a plurality of SCM cells, and managing memory accesses comprises providing read and write signals for reading and writing said mixed cell memory.

10. A method as in claim 9, wherein said performance memory comprises dynamic random access memory (DRAM), both DRAM and SCM being allocated for at least one request, and managing memory accesses comprises maintaining a memory map of allocated DRAM space and space in SCM.

11. A method as in claim 9, wherein said SCM comprises a plurality of Single Level per Cell (SLC) array units and a plurality of Multiple Level per Cell (MLC) array units, said performance memory comprising said plurality of SLC array units.

12. A method as in claim 11, wherein said SCM is selectable as SLC or MLC, allocating said mixed cell memory comprises selecting SCM array units as SLC or MLC.

13. A method as in claim 12, wherein during each access said SLC units and said MLC units indicate cell capacity, managing memory accesses comprises receiving cell capacity indications, and providing SLC and MLC read and write signals for accessing SLC units and said MLC units.

14. A method of managing memory comprising:
   receiving memory space requests in a mixed cell memory from a plurality of processing units, each processing unit being capable of running one or more applications with one or more thread for each application, said mixed cell memory comprising a plurality of memory units including a plurality of performance memory units storing one bit in each cell and a plurality of dense memory units storing multiple bits in each cell;
   identifying content sensitivity for associated applications and threads in each of said requests, content sensitivity including performance requirements;
   allocating space in said mixed cell memory content sensitively allocates all performance memory, all dense memory or a combination of performance memory and dense memory responsive to each memory space request, sufficient performance memory being allocated for identified said applications and threads sensitive to latency, and otherwise allocating sufficient dense memory space; and
   managing memory accesses responsive to allocation.

15. A method as in claim 14, wherein said plurality of memory units, each include a plurality of cells and comprise a plurality of storage class memory (SCM) array units.

16. A method as in claim 15, wherein said plurality of dense memory units comprise more than one of said SCM array units and said plurality of performance memory units comprise dynamic random access memory (DRAM) array units.

17. A method as in claim 16, wherein for at least one said requesting device allocating said space comprises:
   allocating at least one DRAM array unit; and
   allocating at least one SCM array unit.

18. A method as in claim 15, wherein managing memory accesses comprises providing read and write signals for accessing said plurality of SCM array units.

19. A method as in claim 18, wherein said plurality of dense memory units comprise Multiple Level per Cell (MLC) SCM array units and said plurality of performance memory units comprise Single Level per Cell (SLC) SCM array units.

20. A method as in claim 19, wherein said plurality of SCM array units are selectable as either a SLC or MLC, and allocating space comprises selecting cell capacity for each SCM array unit.

21. A method as in claim 20, said SLC units and said MLC units indicating cell capacity during each access, and managing memory accesses comprises selectively providing SLC and MLC read and write signals for accessing SLC units and said MLC units.

* * * * *